United States Patent [19]
Tazartes et al.

[11] Patent Number: 5,999,260
[45] Date of Patent: Dec. 7, 1999

[54] METHOD AND APPARATUS FOR INITIALIZATION OF A FIBER OPTIC GYROSCOPE

[75] Inventors: Daniel A. Tazartes, West Hills; John G. Mark, Pasadena, both of Calif.

[73] Assignee: Litton Systems, Inc., Woodland Hills, Calif.

[21] Appl. No.: 09/119,873

[22] Filed: Jul. 21, 1998

[51] Int. Cl.[6] .................................................. G01C 19/72
[52] U.S. Cl. ............................................................ 356/350
[58] Field of Search ................................... 356/350, 345; 250/227.27, 227.19; 385/12, 14

[56] References Cited

U.S. PATENT DOCUMENTS

5,684,589 11/1997 Mark et al. .............................. 356/350
5,883,716 3/1999 Mark et al. .............................. 356/350

*Primary Examiner*—Samuel A. Turner
*Attorney, Agent, or Firm*—Elliott N. Kramsky

[57] ABSTRACT

A method and apparatus are provided for initializing a closed-loop fiber optic gyroscope system of the type that includes a fiber optic gyroscope for generating an interferometric measurement of phase shift and a demodulator for converting the gyroscope output to a corresponding value in a predetermined format for application to a feedback integrator. In contrast to prior art methods and apparatus that require recapture, the present invention relies upon the concept of resetting the initial value received from the gyro to a corresponding value that lies within the zeroeth fringe of a gyro output. The feedback integrator includes an arithmetic unit with feedback. The resetting process consists of the performance of an operation upon the value. Such operations include shifting and copying functions when the predetermined format is two's-complement logic, integer function when the predetermined format is fixed point logic and both INTEGER and ROUND functions when the predetermined format is floating point logic.

15 Claims, 5 Drawing Sheets

METHOD AND APPARATUS FOR INITIALIZATION OF A FIBER OPTIC GYROSCOPE

BACKGROUND

1. Field of the Invention

The present invention relates to methods and apparatus for facilitating the operation of a closed-loop fiber optic gyroscope. More particularly, this invention pertains to methods and apparatus for obtaining accurate rate information at loop initialization.

2. Description of the Prior Art

The Sagnac interferometer is an instrument for determining rotation by measurement of the non-reciprocal phase difference generated between a pair of counterpropagating light beams. This instrument generally comprises a light source such as a laser, an optical waveguide consisting of several mirrors or a plurality of turns of optical fiber, a beamsplitter/combiner, a detector and a signal processor.

In an interferometer, the waves coming out of the beamsplitter counterpropagate along a single optical path. The optical waveguide is "reciprocal"; that is, any distortion of the optical path affects the counterpropagating beams similarly although they do not necessarily experience such perturbation at the same time or in the same direction. Time-varying perturbations may be observed where the time interval is comparable to the propagation time of the light around the optical waveguide whereas "non-reciprocal" perturbations affect the counterpropagating beams differently and according to the direction of propagation. Such non-reciprocal perturbations are occasioned by physical effects that disrupt the symmetry of the optical medium in which the two waves propagate. Two of the non-reciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of both the ring and the fiber optic gyroscopes.

It is known that the fringe or interference pattern formed by the counterpropagating beams of a gyro consists of two elements, a d.c. component and a component that is related (e.g. cosine function) to the source of the phase difference between the beams. This phase difference provides a measure of the non-reciprocal perturbation due, for example, to rotation. As a consequence of the shape of the fringe pattern, when small phase differences are to be measured (e.g. low rotation rates), the intensity of the combined beam is relatively insensitive to phase difference as such difference occurs close to the maximum of the phase fringe pattern. Further, mere intensity of the composite beam does not indicate the sense or direction of rotation.

The above-described characteristics that result from the shape of the fringe pattern are commonly addressed by the superposition of an artificially biased phase difference upon the counterpropagating beams. The biasing of the phase shift, also known as "non-reciprocal null-shift," enhances the sensitivity of the intensity measurement to phase differences. A maximum degree of sensitivity is achieved by shifting the operating point of the gyroscope to $\pm\pi/2$ (or odd multiples thereof). Furthermore, by alternating the bias between $+\pi/2$ and $-\pi/2$, two different operating points are observed. This enables the system to separate the effects of phase differences from those of d.c. intensity changes.

In addition to phase modulation, the processing of an interferometer output commonly employs "phase nulling" that introduces an additional phase shift through a negative feedback mechanism to compensate for that due to the non-reciprocal (Sagnac) effect. Commonly, the negative feedback generates a phase ramp whose slope is proportional to the rate of rotation to be measured. In actual practice, a ramp whose height varies between 0 and $2\pi$ radians is employed as the nulling phase shift cannot be increased indefinitely due to voltage constraints.

Various solutions to the problems associated with the design of closed loop or feedback systems for measuring rotation rate by means of a fiber optic gyroscope are disclosed in a number of U.S. patents. Ser. No. 4,705,399 of Graindorge et al. discloses a digitally-based arrangement that employs a "stairstep" waveform in which the height of each step is equal to the measured phase difference while the width or period of each is the group delay time of the optical coil. On the average, the slope of the ramp is equivalent to the measured non-reciprocal phase difference per unit of time. The phase modulation may be directly added to the digital ramp through the synchronization offered by a digital signal processor to generate a combined signal that controls a phase modulator. U.S. Pat. No. 5,337,143 of John G. Mark and Daniel A. Tazartes entitled "Loop Controller For Multiplexed Triaxial Gyro" discloses an application specific integrated circuit ("ASIC") that functions as a loop controller for a triaxial gyro. The controller accepts the digitized outputs of three modulated gyros, measures the rotation associated with each, digitally processes the outputs and provides analog signals for driving the gyro phase modulators. Microprocessor control adds a degree of flexibility, enabling the use of various types of modulation (e.g. random, pseudo-random, orthogonal, deterministic) and enhanced computational power for updating system parameters. U.S. Pat. No. 5,684,589 of John G. Mark and Daniel A. Tazartes entitled "Loop Controller For Fiber Optic Gyroscope With Distributed Data Processing" discloses a loop controller architecture that includes distinct units for distributing the necessary data processing functions, allowing operations to occur in parallel to enable additional useful gyro functions within each loop transit time. The gyro architecture eliminates any need for the gyro processor to perform throughput-intensive test and branch operations.

Pending U.S. patent application Ser. No. 08/893,961 of John G Mark and Daniel Tazartes entitled "Rate Control Loop For Fiber Optic Gyroscope" teaches a closed loop gyro configured to reduce the impact of so-called deadbeat residual error that is recognized as a significant contributor to bias error in, for example, high-g operational environments. This is accomplished by employing a rate controller within the feedback path that includes a cascaded plurality of feedback integrators. Such arrangement results in the assumption of a higher-order relationship of residual gyro error to sensed gyro rate.

Each of the above-described arrangements is subject to turn-on errors that are difficult to detect. An interferometric fiber optic gyro operates on a modulo $2\pi$ basis in which a phase shift of $\phi+2n\pi$ is indistinguishable to a first order from one of $\phi$, n being an integer. This, of course, follows from the cosine relationship that describes the interferometric relationship between intensity I and phase shift $\phi$. Such relationship is preserved upon conversion to an electrical output at a photodetector. For gyros with large Sagnac scale factors (ratio of $\Delta\phi$, phase offset to $\dot\theta$, gyro rate) that operate over a substantial range of angular rates such inherent ambiguity can be troublesome, particularly at system turn-on. For example, a 1000 m gyro with a Sagnac scale factor of 3.5 μrad./degree/hr. exhibits a phase shift of ±π at angular rates of ±250 degrees/second. The rate tracking of the closed-loop gyro system must therefore operate to values of greater than ±π if operation beyond ±250 degrees/second is anticipated, a scenario that is present in the case of virtually all present-day high performance aircraft.

In the above-described closed-loop prior art gyro arrangements it is assumed that the closed-loop system will power up in all cases within the zeroeth mode or fringe defined by the range $-\pi < \phi < \pi$. As the rate increases during operation of a craft, changes in phase are registered and accumulated within a feedback integrator so that values well outside the zeroeth fringe can be tracked within the feedback integrator of the loop. Each of the prior art arrangements includes apparatus such that the value fed back will properly remain within the zeroeth fringe so that errors and voltages for driving the phase modulator(s) are minimized. For example, in U.S. Pat. No. 5,684,589, the binary word representing the phase ramp integrator is scaled such that it will accommodate only the range $-\pi$ to $\pi$. Values added or subtracted to this integrator may cause overflows that exactly represent rollovers in the amount of ±2π, thus preserving the modulo 2π operation. A left shift operation between the primary feedback integrator and the phase ramp integrator also ensures that the range of the feedback integrator is substantially greater than ±π.

Generally, the assumption of rate within the zeroeth fringe upon initialization works well. However, various sources can produce false fringe capture upon power-up. This can occur, for example, in the presence of large signals at initialization that can lead to an accumulation in the feedback integrator outside the zeroeth fringe. As the gyro is insensitive to excess numbers of ±2π or multiples thereof, the tracking loop can thereafter be completely stable despite providing a large rate estimate (and, hence, error) due to the initial false phase accumulation within the feedback integrator.

The prior art has addressed the problem of accumulation-induced error by clearing the phase-tracking feedback integrator some time after initialization, then recapturing the loop once the signals have settled. This approach has the undesirable consequence of requiring loop re-capture that can consume valuable time. The loop of pending U.S. patent application Ser. No. 08/893,961, which, as mentioned above, discloses a gyro arrangement for higher order operation, unfortunately leads to even more difficult initial loop capture procedures as simply resetting the phase-tracking accumulator to zero will generate a transient that can cause the loop to drive to a large value before recapturing. This re-opens the possibility of operating on the wrong fringe.

SUMMARY OF THE INVENTION

The present invention addresses the foregoing and other shortcomings of the prior art by providing in a first aspect, a closed-loop fiber optic rotation sensing apparatus. Such apparatus includes a fiber optic gyroscope for generating an interferometric measurement of phase shift. A feedback integrator is provided as well as a demodulator for converting the output of the gyroscope to a corresponding value in a predetermined format for application to the feedback integrator.

The feedback integrator includes an arithmetic unit for receiving the value at a first input port. A feedback path links the output of the unit to a second input port of the unit. Means are provided within the feedback path for operating upon the value and providing an output. Such means includes means for resetting the value to a corresponding value in the predetermined format that lies within the zeroeth fringe of the gyroscope output.

In a second aspect, the invention provides a method for initializing a feedback integrator comprising an arithmetic logic unit with feedback in a closed-loop system of the type that includes a fiber optic gyroscope for generating an interferometric measurement of phase shift and a demodulator for converting the output of the gyroscope to a corresponding value in a predetermined format for application to the feedback integrator. Such method includes the step of receiving the value from the arithmetic logic unit. The value is then reset to a corresponding value in such predetermined format that lies within the zeroeth fringe of the output of the gyroscope.

The preceding and other features and advantages of this invention will become apparent from the detailed description that follows. Such written description is accompanied by a set of drawing figures. Numerals of the drawing figures, corresponding to those of the written description, point to the features of the invention, like numerals referring to like features throughout.

DETAILED DESCRIPTION OF THE PREFERRED EMBODIMENT

Figure 1:
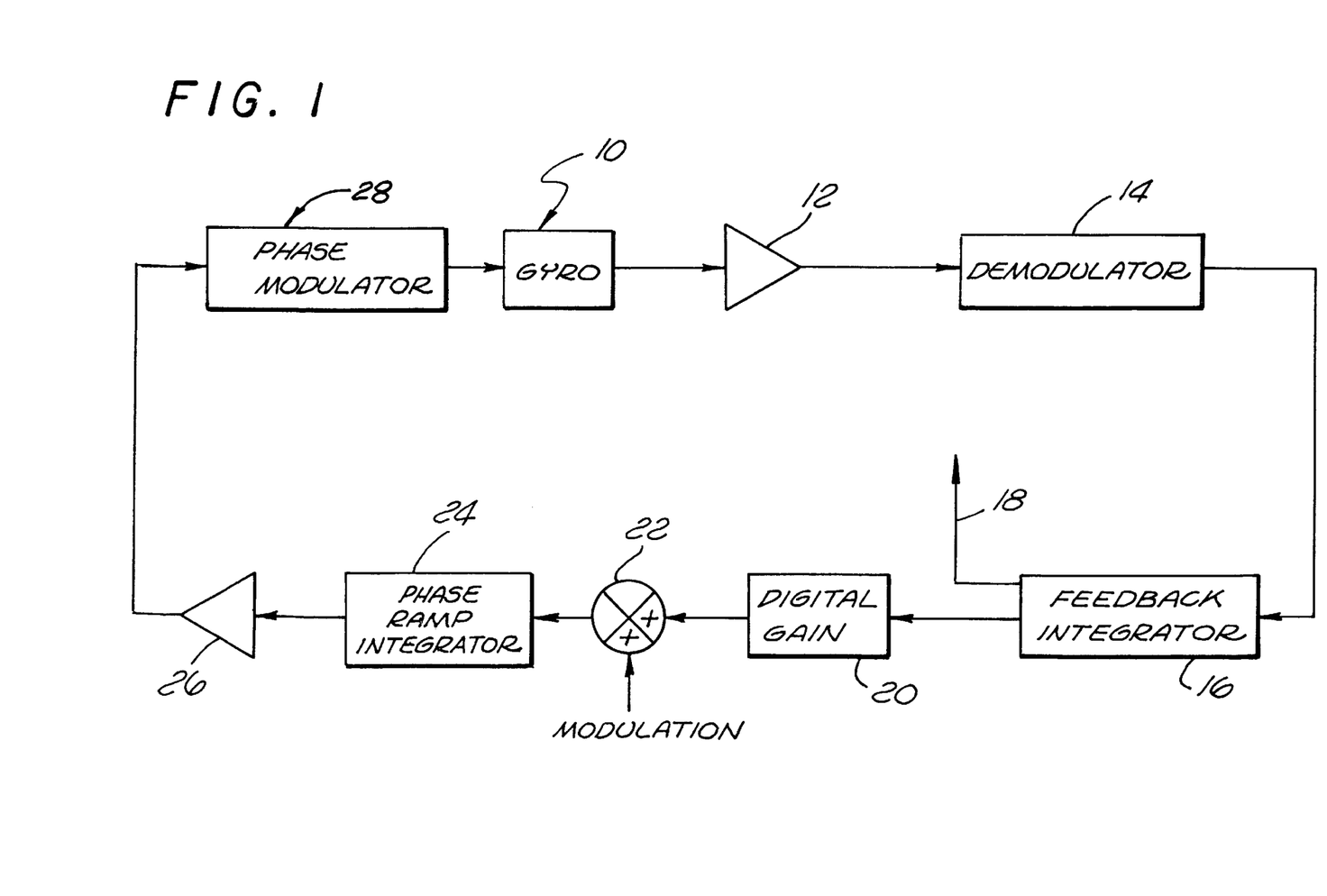
FIG. 1 is a generalized block diagram of a closed-loop fiber optic gyro system incorporating a feedback integrator with zeroeth fringe reset in accordance with the invention.

FIG. 1 is a generalized block diagram of a closed-loop fiber optic gyro system that incorporates a feedback integrator with zeroeth reset in accordance with the invention. It will be seen that the invention is generally applicable to closed-loop gyro systems (some of which have been described in the background portion of this application) that employ various digital systems including, but not limited to two's complement, fixed point and floating point arithmetic.

A coherent light source (not shown) applies an output beam to a gyro 10 that includes a coil of optical fiber and an associated coupler (not shown) for dividing the output beam into a pair of beams that counterpropagate within the coil. The interferometric output beam from the gyro 10 is received by an optical receiver 12 that may include photodetector, preamplifier and filter component elements for converting the optical energy into a corresponding analog electrical signal. The output of the optical receiver 12 drives a demodulator 14 that includes an analog-to-digital converter for producing a digital signal representative of the demodulated output of the gyro 10. Such output of the demodulator 14 comprises a word consisting of a series of digital data bits in predetermined format that describes the detected value of the phase error $\Delta\phi$. Such word is applied to a feedback integrator 16 that incorporates zeroeth fringe reset in accordance with the invention. Such reset drives or converts the value of the integrator to lie within the range $-\pi<\phi<\pi$ of the zeroeth fringe. It will be seen that the invention provides that the reset value of $\phi$ is selected to lie at a point on the continuum of $\phi$ values that bears the same relationship to the interferometric intensity output I as does the initially input value of $\phi$. In contrast with prior art methods for initializing the gyro control loop, such resetting of the initial value of $\phi$ does not involve wasteful and often erroneous loop recapture techniques.

The reset value of $\phi$ output from the feedback integrator 16 is multiplied by the gyro scale factor and read out as rate $\dot{\theta}$ at 18. Digital gain $2^x$ is applied to the output of the feedback integrator 16 at 20 and modulation (deterministic, random or pseudo random) is applied at 22. The modulated value is applied to a phase ramp integrator 24 that forms the stairstep waveform for application to a driver 26. The voltage output of the driver 26 is applied to the electrodes of a phase modulator 28 for generating a phase shift between the beams of light counterpropagating within the gyro 10.

Figure 2:
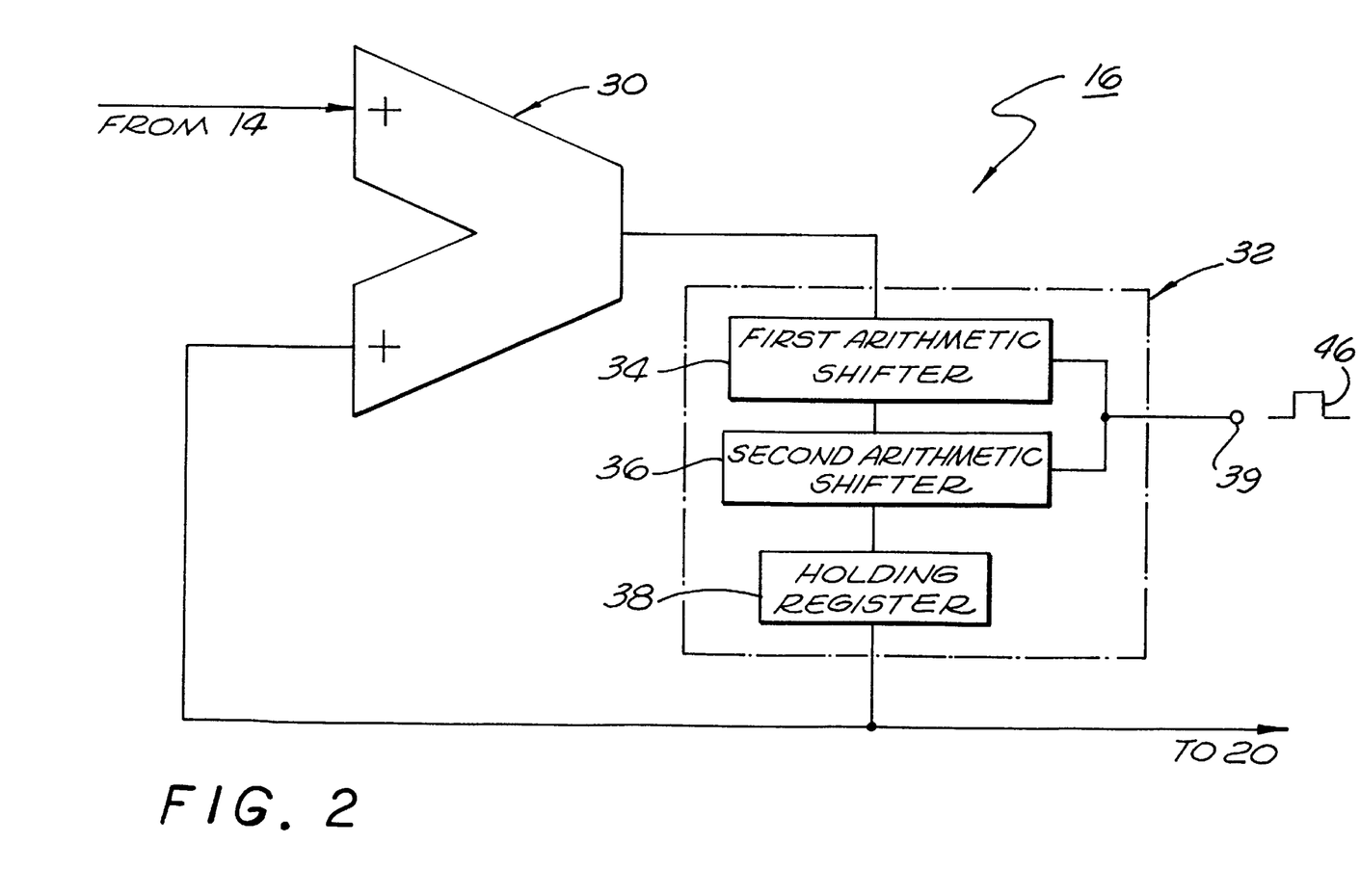
FIG. 2 is a block schematic diagram of a feedback integrator in accordance with the invention for use in a closed-loop system employing two's-complement logic.

FIG. 2 is a block schematic diagram of a feedback integrator 16 in accordance with the invention. The integrator 16 includes an arithmetic logic unit 30 having an input port for receiving the word output from the demodulator 14 and a feedback port for receiving a second input. The feedback arrangement of the arithmetic logic unit 30 enables its operation as an integrator, summing increments of $\phi$ detected during each loop transit time T. Such increments of $\phi$ correspond to increases in $\dot{\theta}$ as the stairstep waveform employed for driving the phase modulator 28 continuously attempts to null the output of the gyro 10. In FIG. 2, it is seen that a processor 32 is located within the feedback loop of the arithmetic logic unit 16. Within the processor 32 there are, in sequence, a first arithmetic shifter 34 for receiving an M-bit word and shifting it leftward by the amount x+M−N where x, as mentioned earlier, is the digital shift count leading to a gain of $2^x$ and N is an integer no greater than M. A second (rightward) arithmetic shifter 36 is located after the first arithmetic shifter 34 and is arranged to shift the word it receives rightward by the amount x+M−N. A holding register 38 receives the output of the second arithmetic shifter 36 and applies it to the digital gain 20 as shown in FIG. 1 at the same time such value is fed back to the arithmetic logic unit 30 in preparation for receipt of the next phase increment $\Delta\phi$. Both shifters 34 and 36 are enabled by a signal input at 39. Once the initial accumulation within the loop has been reset to the zeroeth fringe, the signal input at 39 goes low to allow the accumulation of M-bit values outside the zeroeth fringe for application to the digital gain 20 as, after initialization, such values reliably reflect rate measurements.

Figure 3:
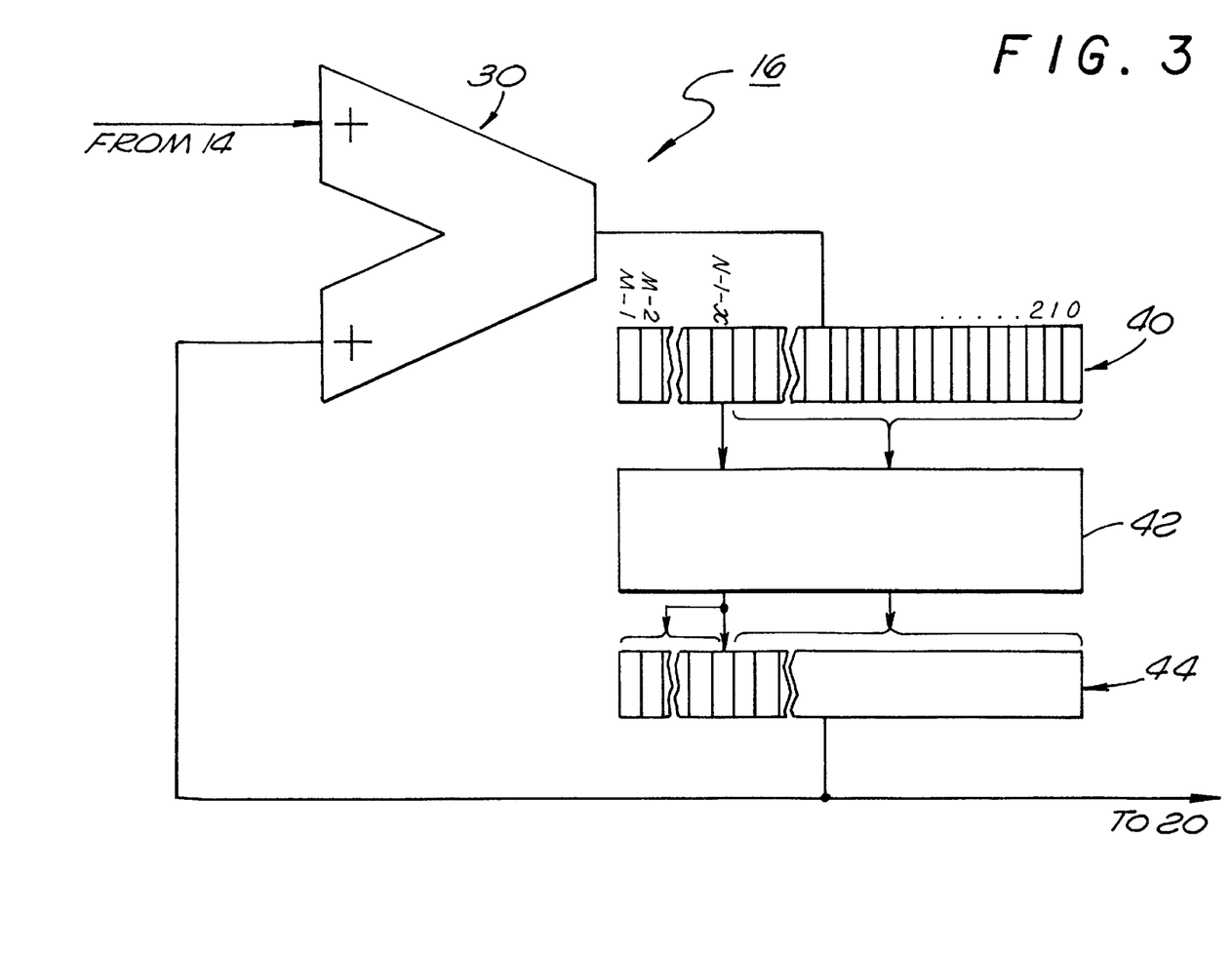
FIG. 3 is a block schematic diagram of a feedback integrator in accordance with an alternative embodiment of the invention for use in a closed-loop system employing two's complement logic.

An alternative embodiment of the invention is shown schematically in FIG. 3. Again, the feedback integrator 16 includes an arithmetic logic unit 30 for receiving the output of the demodulator 14 at an input port and a feedback port for receiving the output of a feedback loop. Unlike the embodiment of FIG. 2, the embodiment of FIG. 3 includes a first M-bit register 40 for receiving an M-bit word in two's-complement logic from the arithmetic logic unit 30, a switching matrix 42 for receiving the content of the first register 40 and transforming it to a second M-bit word for application to a second register 44. The content of the second register 44 is then applied both to the digital gain 20 as shown in FIG. 1 and to the feedback terminal of the arithmetic logic unit 30 for processing the next phase increment $\Delta\phi$.

Figure 4:
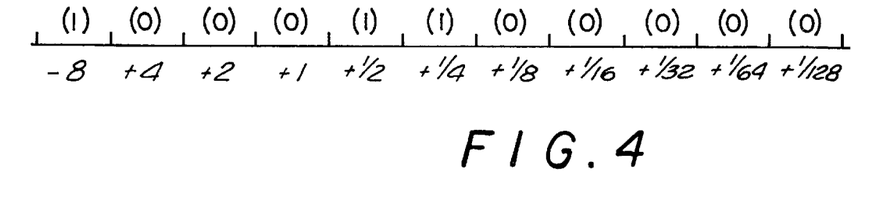
FIG. 4 illustrates an example of two's-complement representation.

Each of the embodiments of FIGS. 2 and 3 is based upon a closed loop gyro that is operative in two's-complement logic. An appreciation of the nature of such logic is essential for comprehending the reset mechanism and operations of such embodiments. In two's-complement logic a value may be encoded into an M bit word as follows: the most significant bit is associated with the positive or negative sense and all other bits are associated with the opposite sense; thus the sign of the resultant value is determined by the value (0 or 1) of the most significant bit; the remaining bits, beginning with the next-most significant bit and proceeding through to the least significant bit, correspond to a sequence of values decreasing by successive powers of 2. FIG. 4 illustrates an example of the above-described structure for an 11-bit sequence in accordance with the two's-complement format. As can be seen, the most significant bit corresponds to "−8" while subsequent bits correspond to positive values successively decreasing by powers of 2. Referring to the structure for an 11 bit word illustrated in FIG. 4, the sequence "1 0 0 0 1 1 0 0 0 0 0" represents the two's-complement encoding of the value −7¼ (i.e, 1·(−8)+ 0·4+0·2+0·1+1·½+1·¼+0·⅛+0·1/16+0·1/32+0·1/64+0·1/128).

It is a property of two's-complement logic that the values to the right of the most significant bit (MSB) sum asymptotically to the value of the most significant bit with a reversal of sign. This logic and notation are extremely well suited to represent phase difference $\phi$ since it provides a useful logic for identifying values of $\phi$ existing on a bounded continuum. (E.g. $-8\pi \leq \phi \leq 8\pi$ as shown in FIG. 4).

The embodiments of FIGS. 2 and 3, each of which is arranged to operate within a system employing two's-complement logic, perform equivalent operations upon the value output from the demodulator 14. In each embodiment, the closed loop gyro system is arranged such that the maximum value input to the phase ramp integrator 24 comprises an N-bit word. Accordingly, $2^N$ is equivalent to $2\pi$ in this system. Referring to FIG. 1, the output of the feedback integrator 16 is such that $2^{N-x}$ is equivalent to a phase difference of $2\pi$ as the output of the feedback integrator undergoes a digital gain of $2^x$ prior to application to the phase ramp integrator 24 (with modulation applied at 22).

Assuming that the closed-loop system of FIG. 1 employs M-bit two's-complement logic, referring first to the embodiment of FIG. 2, upon initialization of the loop, a "high" or "on" pulse 46 enables the arithmetic shifters 34 and 36 of the processor 32. Within the first shifter 34, the M-bit value initially output from the arithmetic logic unit 30 is shifted leftward so that the bit corresponding to the value $2\pi$ becomes the most significant bit (MSB) and all bits higher than that bit are discarded. That is, the M−(N−x) bits of the initial output of the arithmetic logic unit 16 are discarded as the bits to the right (i.e. "lesser bits") of the (N−x)th bit "follow" that bit leftward. The resultant word is then shifted rightward by the identical amount (M−N+x) at the enabled second arithmetic shifter 36. It is a well-known property of an arithmetic shifter that, upon a rightward shifting, the MSB of the word prior to shifting is copied into as many bits as the word is shifted. Thus, upon shifting by the second arithmetic shifter 36, the M-bit word thereafter entered into the holding register 38 is of the form:

i) First (M−N+x) bits: all 1's or 0's; and
ii) Remaining N−x bits: identical to least significant N−x bits of M-bit output of arithmetic logic unit 16.

It may be qualitatively appreciated that the above transformation properly locates the value initially output by the arithmetic logic unit 16 within the zeroeth fringe. Referring back to FIG. 4 and the discussion accompanying such figure, the transformation accomplished by the zeroeth fringe reset of the feedback integrator 16 produces an M-bit word whose (N−x) least significant bits define a value within the zeroeth fringe. (It should be noted that the N−x bits are themselves in two's-complement format.

Should the (N−x)th bit represent a negative value, the most significant M−N+x bits stored in the holding register 38 are identically 1's. In the event that the N−x least significant bits represents a positive value within the zeroeth fringe, the most significant M−N+x bits are all 0's when processed in accordance with FIG. 2. Referring back to the operation of two's-complement logic as described above, it can be verified that, in either case, the M-bit word applied to the holding register 38 is the equivalent value of $\phi$ (in terms of the fringe pattern of interferometer output) lying within the zeroeth fringe. That is, if $\phi_m$ denotes the modified value of $\phi$ output to the register 38, then $\phi_m = \phi - 2\pi n$ where n is an integer such that $-\pi \leq \phi_m < \pi$.

Once the value initially output by the arithmetic logic unit 30 has been properly shifted to the equivalent zeroeth fringe value of $\phi$, the input to the enable terminal 39 goes low, permitting the output of the arithmetic logic unit 30 to be fed back with a time delay of $\tau$. The output of the feedback integrator 16 is now free to grow, if appropriate, outside the bounds of the zeroeth fringe. In cases where long initial transients are anticipated, the enable control 39 may be held "on" for an extended period of time.

Figure 5:
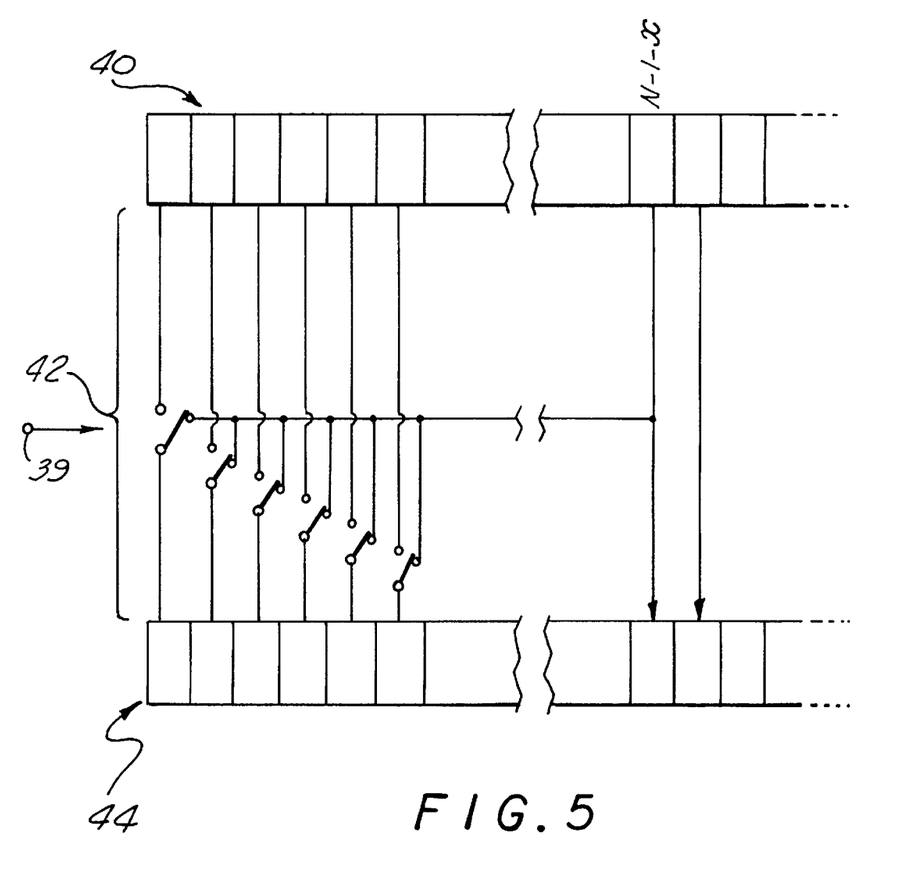
FIG. 5 is a circuit schematic view of the switching matrix of the embodiment of FIG. 3.

A substantially-identical operation is accomplished within the embodiment of FIG. 3. The initial output of the arithmetic logic unit 30 is applied to a first M-bit register 40. The M-bit value stored within the register 40 is transformed by means of the switching matrix 42 so that the word stored in the second register 44 comprises the identical N−x least significant bits of the word stored within the first register 40. The most significant M−N+x bits are identical to the (N−x)th bit. FIG. 5 is a schematic diagram of a switching matrix 42 for accomplishing such transformation. As will be appreciated, the M-bit word stored in the holding register 44 of the embodiment of FIG. 3 is the same as that which would have been stored in the holding register 38 of the embodiment of FIG. 2. Accordingly, the same zeroeth-fringe reset transformations are accomplished in a two's-complement system as illustrated in FIGS. 2 and 3. The zeroeth mode reset is controlled by the reset command 39. When enabled, the command 39 sets all switches of the switching matrix 42 to their "lower" position to force modification of the upper bits. When disabled, the command 39 sets all switches to their normal "upper" position whereby the content of the register 40 is identically copied into the register 44.

The teachings of the present invention have been illustrated with reference to a closed-loop system employing two's-complement digital logic. However, the invention is not limited to closed-loop systems employing such logic. Rather, the central concept of the invention, namely, the initial resetting of the output of the feedback integrator 16 to a corresponding value within the zeroeth fringe, may be extended to closed-loop or open-loop systems employing other systems of digital logic.

It can be shown that a number Y defined as $x - 2\pi m$ will lie within the zeroeth fringe ($-\pi \leq Y < \pi$) when m is defined by either of the following terms:

$m = INT(\frac{1}{2}((x/\pi) + 1))$; or

Where INT( ) truncates to the next lower (or equal) integer.

$m = ROUND(x/2\pi)$

Where ROUND( ) rounds to the nearest integer.

Figure 6:
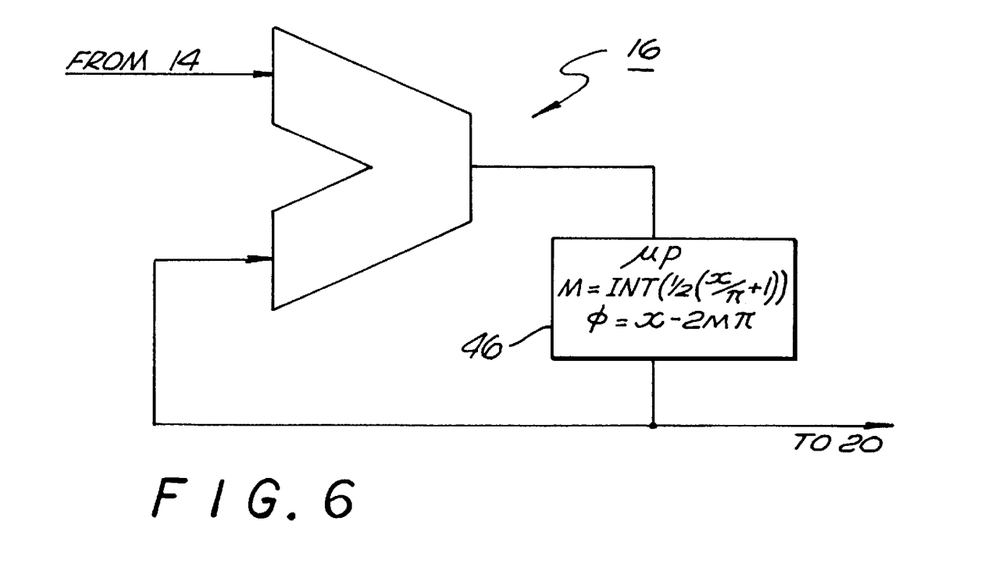
FIG. 6 is a block schematic diagram of a feedback integrator for use in a system employing fixed- or floating-point arithmetic.
Figure 7:
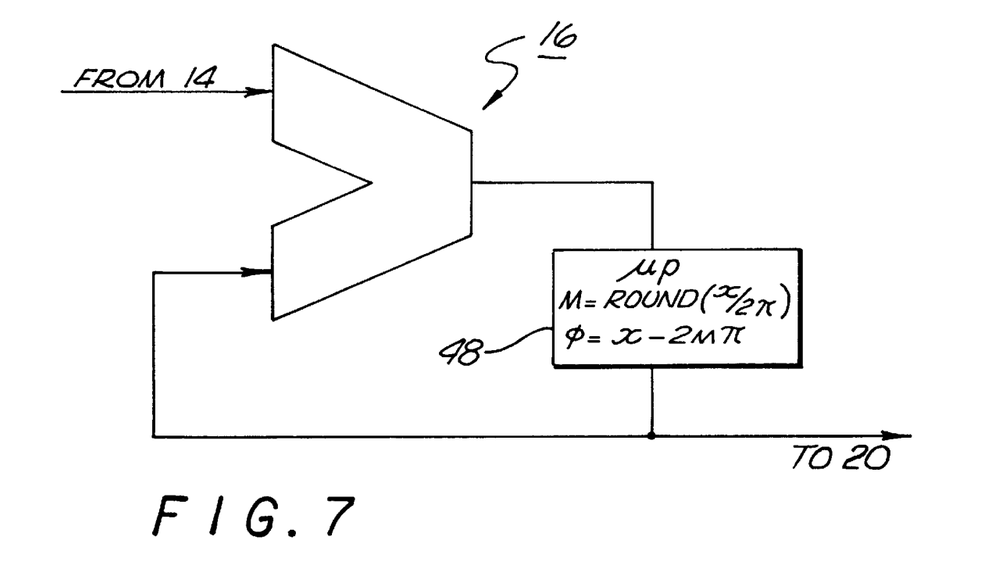
FIG. 7 is a block schematic diagram of an alternative embodiment of a feedback integrator for use in a system employing floating point arithmetic.

Each of the above-identified operations may be performed within a feedback integrator 16 configured generally in accordance with the invention. That is, reset value of $\phi$ within the zeroeth fringe can be derived from the initial value of $\phi$ output by the arithmetic logic unit 30 of the feedback integrator 16 by operating upon x within the feedback loop of the arithmetic logic unit 30 in accordance with either of the above-described operations. FIG. 6 is a block schematic diagram of a feedback integrator for use in a system employing floating-point arithmetic while FIG. 7 presents an alternate embodiment thereof. Each of FIGS. 6 and 7 corresponds generally to the two's-complement logic embodiments of FIGS. 2 and 3. In the embodiment of FIG. 6, the INT (for "integer") operation is performed as defined above within a microprocessor 46 while, in the embodiment of FIG. 7, the ROUND operation is performed within a microprocessor 48 of the feedback of the arithmetic logic unit 30. Both the ROUND and INT operations are easily implemented in floating point arithmetic. Equivalent embodiments of the invention may be formulated for any additional numeric formats (e.g. binary offset:) with the details of a specific implementation (i.e. equivalents of the functions performed by the processors 46 and 48) depending upon the format and the representation of $\pi$ employed.

Thus it is seen that the present invention provides an improved method for initializing a closed-loop gyro system. By employing the teachings of the present invention, one may obtain reliable readings of rotation rate throughout the entire duration of operation of such a system. This is a significant contrast and improvement over prior art systems that require difficult and often unreliable re-capture processes.

While this invention has been illustrated and described with reference to its presently-preferred embodiment, it is not limited thereto. Rather, this invention is limited only insofar as it is defined by the following set of patent claims and includes within its scope all equivalents thereof.

What is claimed is:

1. A closed-loop fiber optic rotation sensing apparatus comprising in combination:
   a) a fiber optic gyroscope for generating an interferometric measurement of phase shift;
   b) a feedback integrator;
   c) a demodulator for converting the output of said gyroscope to a corresponding value in a predetermined format for application to said feedback integrator;
   d) said feedback integrator including an arithmetic unit for receiving said value at a first input port;
   e) a feedback path linking the output of said unit to a second input port of said unit;
   f) means within said feedback path for operating upon said value and providing an output; and
   g) said means including means for resetting said value to a corresponding value in said format that lies within the zeroeth fringe of the output of said gyroscope.

2. Closed loop apparatus as defined in claim 1 further characterized in that:
   a) said predetermined format is 2's complement logic;
   b) said corresponding value comprises a first M bit word;

c) said closed-loop system additionally includes means for applying digital gain of $2^x$ value to the output of said feedback integrator; and d) said means for resetting including means for transforming said first word to a second M bit word such that the most significant M−N+x bits of said second word are identical to the (M−N+x)th bit of said first word and the remaining bits of said second word are identical to the corresponding bits of said first word.

3. Closed loop apparatus as defined in claim 2 wherein said means for transforming additionally includes:

a) a first register comprising M stages;

b) means for shifting the content of said register both upward and downward through M−N+x stages of said register where N is an integer no greater than M; and c) means for copying the (N−x)th least significant bit of said word into the M−N+x highest stages of said register.

4. Closed loop apparatus as defined in claim 2 wherein said means for transforming additionally includes:

a) an arithmetic shifter; and b) means for causing said shifter to shift said first M bit word upward by M−N+x bits and then downward by M−N+x bits.

5. Closed loop apparatus as defined in claim 1 further characterized in that:

a) said predetermined format is fixed point logic; and b) said means for resetting comprises means for applying an integer operation to said value.

6. Closed loop apparatus as defined in claim 1 further characterized in that:

a) said predetermined format is floating point logic; and b) said means for resetting comprises means for applying an integer operation to said value.

7. Closed loop apparatus as defined in claim 1 further characterized in that:

a) said predetermined format is floating point logic; and b) said means for resetting comprises means for applying a round operation to said value.

8. A method for initializing a feedback integrator comprising an arithmetic unit with feedback in a closed-loop system of the type that includes a fiber optic gyroscope for generating an interferometric measurement of phase shift and a demodulator for converting the output of said gyroscope to a corresponding value in a predetermined format for application to said feedback integrator, said method comprising the steps of:

a) receiving said value from said arithmetic unit; then b) resetting said value to a corresponding value in said format that lies within the zeroeth fringe of the output of said gyroscope.

9. A method as defined in claim 8 wherein the step of resetting includes the step of performing a predetermined logic operation upon said value.

10. A method as defined in claim 9 further including the steps of:

a) formatting said value into a first M bit word in 2's complement logic; then b) performing said logic operation by transforming said first word to a second M bit word in which the M−N+x most significant bits are the same as the (M−N+x)th bit of said first word and the remaining bits of said second word are identical to the corresponding bits of said first word where N is an integer no greater than M and $2^x$ is the digital gain of said closed loop system; then c) applying said second word to said arithmetic unit; and then d) repeating steps a through c above.

11. A method as defined in claim 10 wherein the step of transforming further comprises the steps of:

a) providing a first register comprising M stages; then b) entering said M bit word into said first register; then c) shifting the N−x least significant bits of said word upward through M−N+x stages of said first register; then d) shifting said N−x bits downward through said M−N+x highest stages of said first register; and e) copying said N−x most significant bit of said word into said M−N+x highest stages of said first register; then f) feeding back the content of said first register as an M bit 2's complement word to said unit; and then g) repeating steps b through f above.

12. A method as defined in claim 10 wherein the step of transforming further comprises the steps of:

a) applying said first word to an arithmetic shifter; then b) shifting said word upward by M−N+x bits; and then c) shifting said word downward by M−N+x bits.

13. A method as defined in claim 9 further comprising the steps of:

a) formatting said value into fixed point logic; and then b) applying an integer operation to said value.

14. A method as defined in claim 9 further comprising the steps of:

a) formatting said value into floating point logic; and then b) applying an integer operation to said value.

15. A method as defined in claim 9 further comprising the steps of:

a) formatting said value into floating point logic; and then b) applying a round operation to said value.

* * * * *